US010243248B2

United States Patent
Puente et al.

(10) Patent No.: US 10,243,248 B2
(45) Date of Patent: Mar. 26, 2019

(54) DEVICES AND METHODS RELATED TO HIGH POWER DIODE SWITCHES

(71) Applicant: SKYWORKS SOLUTIONS, INC., Woburn, MA (US)

(72) Inventors: Richard Mark Puente, Westminster, MA (US); Richard Allen Cory, Dracut, MA (US); Barry E. McCluskey, Windham, NH (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 14/583,578

(22) Filed: Dec. 26, 2014

(65) Prior Publication Data

US 2015/0303977 A1   Oct. 22, 2015

Related U.S. Application Data

(60) Provisional application No. 61/922,743, filed on Dec. 31, 2013.

(51) Int. Cl.
| | |
|---|---|
| *H04B 1/44* | (2006.01) |
| *H01P 1/213* | (2006.01) |
| *H04B 1/40* | (2015.01) |
| *H04B 1/38* | (2015.01) |

(52) U.S. Cl.
CPC ............. *H01P 1/213* (2013.01); *H04B 1/40* (2013.01); *H04B 1/44* (2013.01); *H04B 1/38* (2013.01)

(58) Field of Classification Search
CPC ............... H04B 1/40; H04B 1/44; H04B 1/38

USPC ................................................ 455/73, 78, 83
See application file for complete search history.

(56) References Cited

U.S. PATENT DOCUMENTS

| | | | | |
|---|---|---|---|---|
| 5,877,726 | A * | 3/1999 | Kudoh | H01Q 3/24 342/175 |
| 5,911,116 | A * | 6/1999 | Nosswitz | H04B 1/48 455/82 |
| 6,218,911 | B1 | 4/2001 | Kong et al. | |
| 9,112,504 | B2 * | 8/2015 | Sameshima | H01P 1/15 |
| 2004/0203550 | A1 * | 10/2004 | Xu | H04B 1/48 455/277.1 |
| 2005/0270745 | A1 * | 12/2005 | Chen | H01F 27/2804 361/707 |
| 2006/0141943 | A1 * | 6/2006 | De Graauw | H04B 1/48 455/78 |
| 2008/0030285 | A1 * | 2/2008 | Gurov | H01P 1/15 333/104 |
| 2008/0088388 | A1 | 4/2008 | Kormanyos | |

(Continued)

FOREIGN PATENT DOCUMENTS

JP      04339422 A  * 11/1992

*Primary Examiner* — Tuan Pham

(74) *Attorney, Agent, or Firm* — Chang & Hale LLP

(57) ABSTRACT

Devices and methods related to high power diode switches. In some embodiments, a radio-frequency (RF) switch circuit can include a plurality of first switchable paths implemented between a pole and a first throw, with each first switchable path including one or more PIN diodes. The RF switch circuit can further include a second switchable path implemented between the pole and a second throw, with the second switchable path including one or more PIN diodes. The pole can be an antenna port, and the first and second throws can be transmit (TX) and receive (RX) ports, respectively.

20 Claims, 11 Drawing Sheets

(56) References Cited

U.S. PATENT DOCUMENTS

2008/0305749 A1* 12/2008 Ben-Bassat .............. H04B 1/18
                                                         455/77
2010/0156511 A1   6/2010 Botula et al.
2011/0163792 A1*  7/2011 Ando ........................ H01P 1/15
                                                         327/403
2012/0236464 A1*  9/2012 Hertel ............... H01L 23/49822
                                                         361/311
2013/0049730 A1*  2/2013 Kato .................... H01L 23/642
                                                         323/355

* cited by examiner

RFC TO RF1 STATE

RFC TO RF2 STATE

TRANSMIT STATE

RECEIVE STATE

US 10,243,248 B2

DEVICES AND METHODS RELATED TO HIGH POWER DIODE SWITCHES

CROSS-REFERENCE TO RELATED APPLICATION(S)

This application claims priority to U.S. Provisional Application No. 61/922,743 filed Dec. 31, 2013, entitled DEVICES AND METHODS RELATED TO HIGH POWER DIODE SWITCHES, the disclosure of which is hereby expressly incorporated by reference herein in its entirety.

BACKGROUND

Field

The present disclosure relates to diode switches for radio-frequency (RF) applications.

Description of the Related Art

In some radio-frequency (RF) applications, signals can be routed between an antenna and a transceiver through, for example, one or more transmit paths and one or more receive paths. Such routing of signals can be facilitated by switches.

SUMMARY

In accordance with some implementations, the present disclosure relates to a radio-frequency (RF) switch circuit that includes a plurality of first switchable paths implemented between a pole and a first throw, with each first switchable path including one or more PIN diodes. The RF switch circuit further includes a second switchable path implemented between the pole and a second throw, with the second switchable path including one or more PIN diodes.

In some embodiments, the pole can be an antenna port. The first throw can be a transmit (TX) port configured to receive an amplified RF signal. The plurality of first switchable paths can include a first PIN diode connected in series with a second PIN diode. The plurality of first switchable paths can further include a third PIN diode connected in series with a fourth PIN diode. A node between the first PIN diode and the second PIN diode can be electrically connected to a node between the third PIN diode and the fourth PIN diode.

In some embodiments, the second throw can be a receive (RX) port configured to output a received signal. The RF switch circuit can further include a switchable shunt path implemented between the RX port and a ground. The switchable shunt path can include a shunt PIN diode. The switchable shunt path can further include a capacitance between the shunt PIN diode and the ground. The RF switch circuit can further include a bias port electrically connected to a node between the shunt PIN diode and the ground.

According to some teachings, the present disclosure relates to an antenna switch module (ASM) that includes a grounding pad and an electrical insulator layer implemented over the grounding pad. The ASM further includes a switch circuit having a plurality of first switchable paths implemented between an antenna port and a transmit (TX) port, with each first switchable path including one or more PIN diodes implemented over the electrical insulator layer. The switch circuit further includes a second switchable path implemented between the antenna port and a receive (RX) port, with the second switchable path including one or more PIN diodes implemented over the electrical insulator layer.

In some embodiments, the electrical insulator layer can be a thermal conductor thereby allowing conduction of heat between a PIN diode and the grounding pad. The electrical insulator layer can include aluminum nitride (AlN).

In some embodiments, each PIN diode can be secured to the electrical insulator layer by a thermally conductive adhesive. In some embodiments, the electrical insulator layer can be secured to the grounding pad by a thermally conductive adhesive. In some embodiments, the ASM can further include an overmold implemented over the electrical insulator layer, with the overmold being dimensioned to encapsulate at least the PIN diodes of the switch circuit.

In some implementations, the present disclosure relates to a method for fabricating a radio-frequency (RF) module. The method includes providing or forming an electrical insulator layer. The method further includes forming a switch circuit having a plurality of first switchable paths implemented between a pole and a first throw, with each first switchable path including one or more PIN diodes implemented over the electrical insulator layer. The switch circuit further includes a second switchable path implemented between the pole and a second throw, with the second switchable path including one or more PIN diodes implemented over the electrical insulator layer. The method further includes forming a grounding pad under the electrical insulator layer such that the grounding pad is electrically insulated from each of the PIN diodes of the switch circuit.

In a number of implementations, the present disclosure relates to a radio-frequency (RF) system that includes an antenna, a transceiver in communication with the antenna, and a transmit/receive (T/R) switch implemented between the antenna and the transceiver. The T/R switch includes a grounding pad and an electrical insulator layer implemented over the grounding pad. The T/R switch further includes a switch circuit having a plurality of first switchable paths implemented between an antenna port and a transmit (TX) port, with each first switchable path including one or more PIN diodes implemented over the electrical insulator layer. The switch circuit further includes a second switchable path implemented between the antenna port and a receive (RX) port, with the second switchable path including one or more PIN diodes implemented over the electrical insulator layer.

In some embodiments, the RF system can be implemented as a base station. The first switchable paths can be configured to handle high power associated with amplified transmit signals associated with the base station.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

PIN diodes are utilized in some radio-frequency (RF) applications, such as applications involving high power RF signals. For example, a PIN diode can be utilized as a fast switch to provide switching functionality in RF applications involving high power signals. Described herein are various examples of devices and methods related to RF switches that utilize PIN diodes. Although various examples are described herein in the context of PIN diodes, it will be understood that one or more features of the present disclosure can also be implemented in applications involving other types of diodes. Similarly, although various examples are described herein in the context of RF switches, it will be understood that one or more features of the present disclosure can also be implemented in other types of applications, including non-switching RF applications.

In broad-bandwidth, high-power RF switching applications, PIN diodes can be connected in a series or series/shunt configuration between one or more input ports and one or more output ports. When implemented as such, it is desirable or required to have the cathode contact of a PIN diode be electrically isolated from the ground, and at the same time, have very low thermal impedance to ground to conduct heat out of the switch.

In switches having high RF isolation performance, shunt diodes may also be employed. For systems which only have positive control voltage or current available, one terminal of a shunt diode typically needs to be AC-coupled to a system ground, and reduced or minimized thermal impedance for such a coupling path is typically desirable.

For the purpose of description, PIN diodes, shunt diodes, or simply diodes can be implemented as, for example, silicon-based devices. Other semiconductor process technologies can also be utilized in the PIN diodes/shunt diodes/diodes as described herein.

Described herein various examples of switching devices having desirable features such as low thermal impedance, high RF isolation, and/or low insertion loss. Various switching topologies can be implemented in packaging configurations as described herein to benefit from one or more of the foregoing features, and non-limiting examples of such switching topologies are described in reference to FIGS. 1-8.

Figure 1:
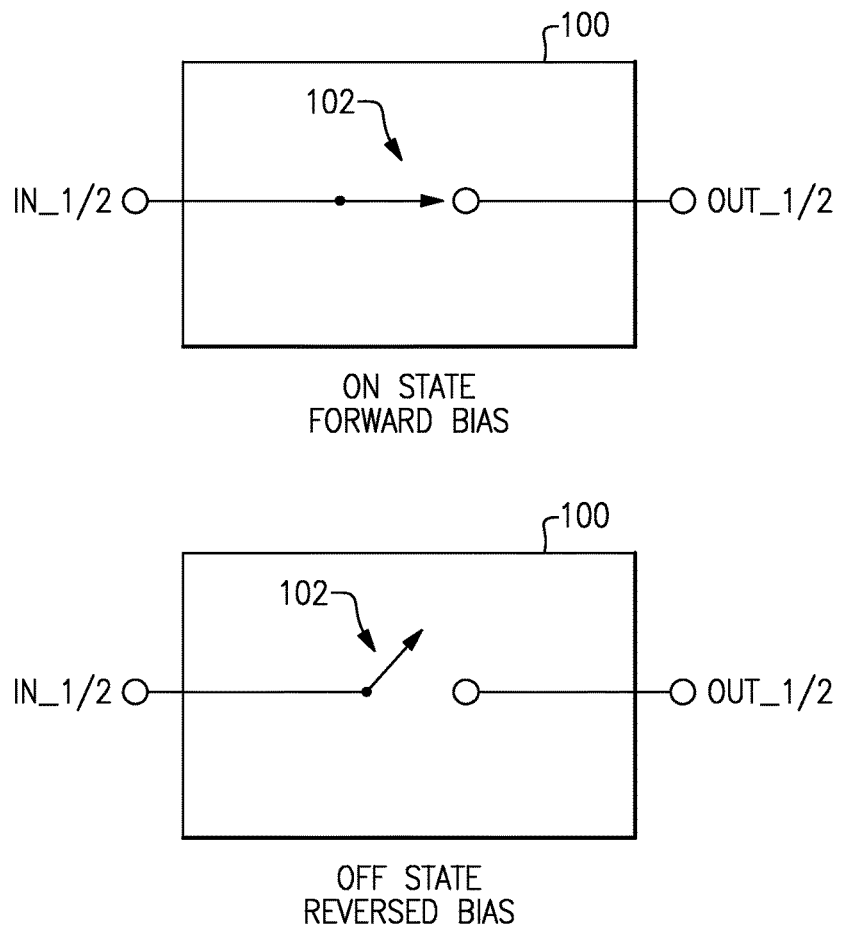
FIG. 1 shows an example topology of a radio-frequency (RF) switch circuit having one or more input ports and one or more output ports.

FIG. 1 shows an example topology of an RF switch circuit 100 having one or more input ports (e.g., IN_1 or IN_2) and one or more output ports (e.g., OUT_1 or OUT_2). A switch 102 can be electrically connected between the input port and the output port along an RF path. In an ON state (e.g., achieved by providing a forward bias), the switch 102 is depicted as being closed, thereby completing the RF path between the input port and the output port. In an OFF state (e.g., achieved by providing a reverse bias), the switch 102 is depicted as being open, thereby breaking the RF path between the input port and the output port.

Figure 2:
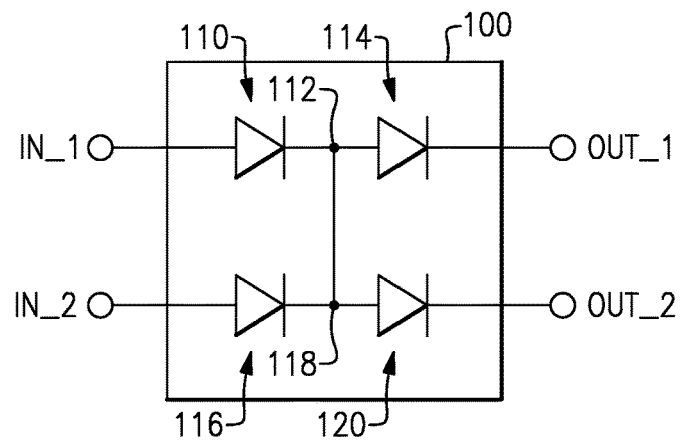
FIG. 2 shows an example RF switch circuit that includes a plurality of PIN diodes that can be configured to provide the functionality of the switch of FIG. 1.

FIG. 2 shows an example RF switch circuit 100 that includes a plurality of PIN diodes that can be configured to provide the functionality of the switch 102 of FIG. 1. In the example of FIG. 2, there are two input ports (IN_1, IN_2) and two output ports (OUT_1, OUT_2); however, it will be understood that other numbers of input port(s) and output port(s) can be utilized.

In FIG. 2, a path between IN_1 and OUT_1 can be formed through a first PIN diode 110, a node 112, and a second PIN diode 114. Similarly, a path between IN_2 and OUT_2 can be formed through a third PIN diode 116, a node 118, and a fourth PIN diode 120. If a path between IN_1 and OUT_2 is desired, such a path can be formed through the first PIN diode 110, the nodes 112, 118, and the fourth PIN diode 120. Similarly, if a path between IN_2 and OUT_1 is desired, such a path can be formed through the third PIN diode 116, the nodes 118, 112, and the second PIN diode 120. Table 1 lists states of the four PIN diodes that can be implemented to achieve the foregoing example paths. For the purpose of description of FIG. 2 and Table 1, it will be assumed that a forward bias on a PIN diode corresponds to an ON state, and a reverse bias corresponds to an OFF state.

TABLE 1

| Input port | Output port | PIN diode 110 | PIN diode 114 | PIN diode 116 | PIN diode 120 |
|---|---|---|---|---|---|
| IN_1 | OUT_1 | ON | ON | OFF | OFF |
| IN_2 | OUT_2 | OFF | OFF | ON | ON |
| IN_1 | OUT_2 | ON | OFF | OFF | ON |
| IN_2 | OUT_1 | OFF | ON | ON | OFF |

Figure 3:
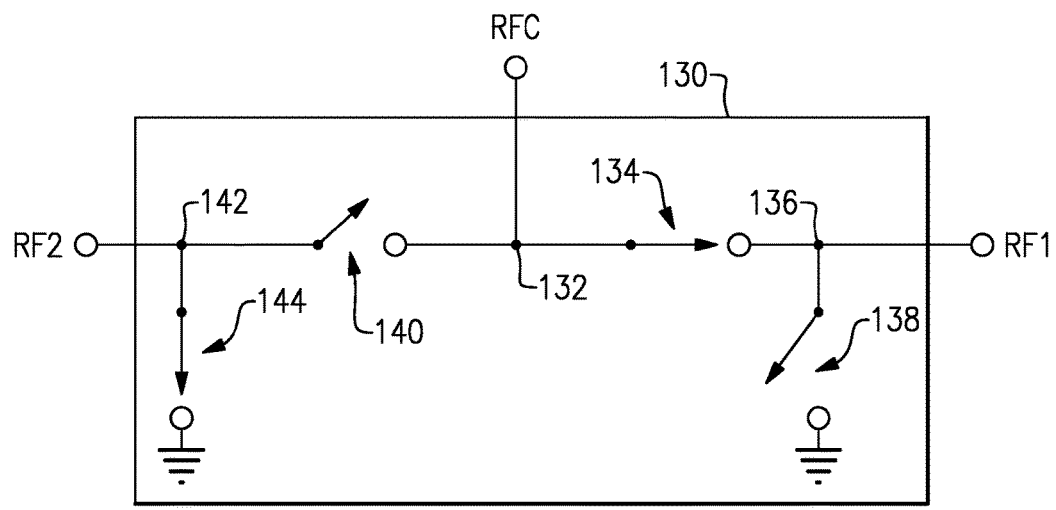
FIG. 3 shows an example topology of an RF switch circuit having a common port and a plurality of RF ports.
Figure 3:
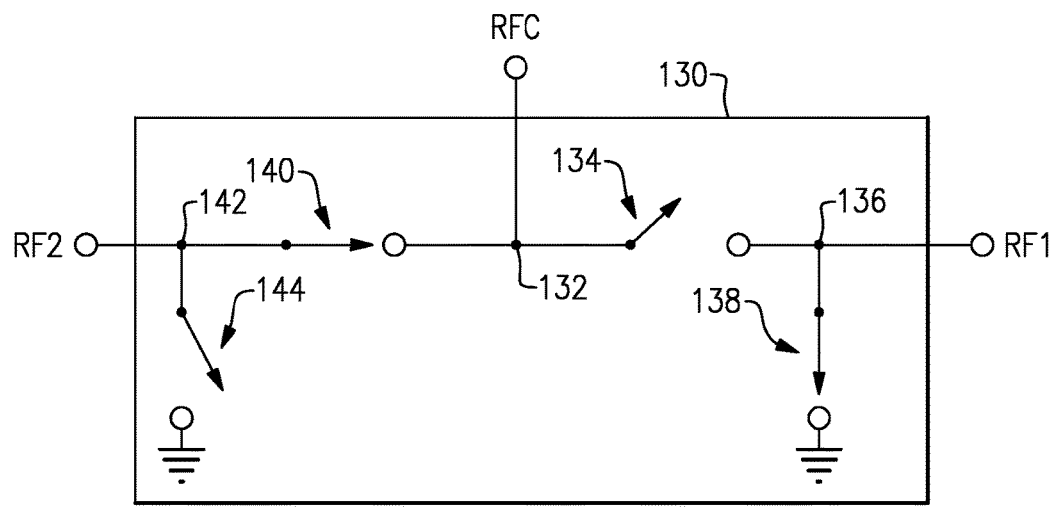

FIG. 3 shows an example topology of an RF switch circuit 130 having a common port RFC and a plurality of RF ports (e.g., RF1 and RF2). Such a topology can be implemented as a single-pole-double-throw (SPDT) with symmetrical switching paths (RF1 and RF2 as the two throws) from a single common port (RFC as the single pole).

A signal path between RFC and RF1 can be achieved with a switch 134 being closed (ON), a shunt switch 138 (between node 136 and ground) being open (OFF), a switch 140 being open (OFF), and a shunt switch 144 (between node 142 and ground) being closed (ON). Similarly, a signal path between RFC and RF2 can be achieved with the switch 140 being closed (ON), the shunt switch 1144 (between node 142 and ground) being open (OFF), the switch 134 being open (OFF), and the shunt switch 138 (between node 136 and ground) being closed (ON). In the example of FIG. 3, the shunt path between node 136 and ground can provide improved isolation for the port RF1 (with the switch 138 closed) when the path between RFC and RF1 is open. Similarly, the shunt path between node 142 and ground can provide improved isolation for the port RF2 (with the switch 144 closed) when the path between RFC and RF2 is open.

Figure 4:
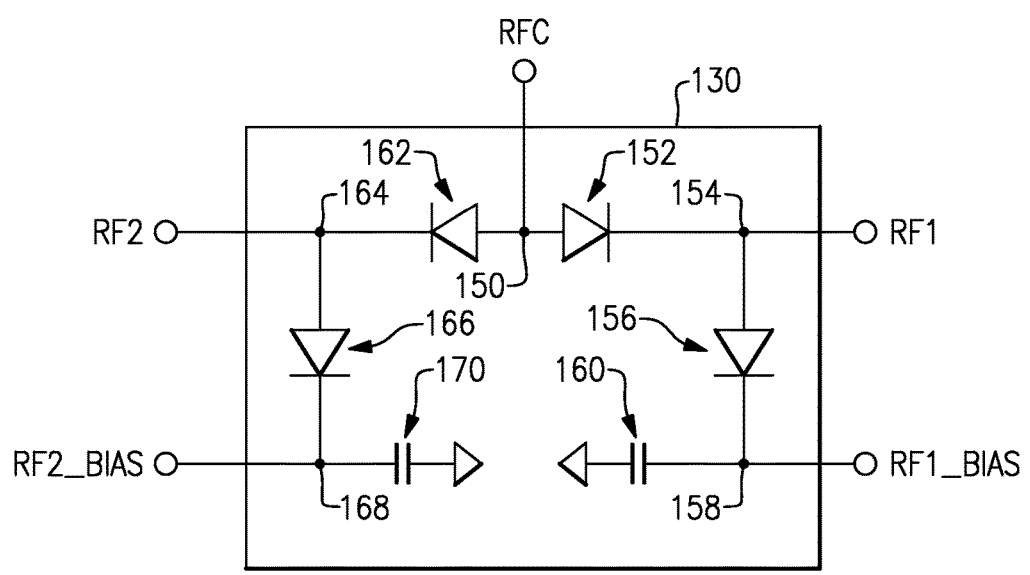
FIG. 4 shows an example RF switch circuit that includes a plurality of PIN diodes that can be configured to provide the functionality of the switches associated with the switching topology of FIG. 3.

FIG. 4 shows an example RF switch circuit 130 that includes a plurality of PIN diodes that can be configured to provide the functionality of the switches associated with the switching topology of FIG. 3. In the example of FIG. 4, a first bias port (RF1_BIAS) for the first shunt diode switch can be provided. Similarly, a second bias port (RF2_BIAS) for the second shunt diode switch can be provided.

In FIG. 4, a first path between RFC and RF1 can be formed through a first PIN diode 152 and node 154. A shunt path for the foregoing first path can be provided between node 154 and ground through a second PIN diode 156, node 158, and a capacitance 160. Similarly, a second path between RFC and RF2 can be formed through a third PIN diode 162 and node 164. A shunt path for the foregoing second path can be provided between node 164 and ground through a fourth PIN diode 166, node 168, and a capacitance 170. Table 2 lists states of the four PIN diodes that can be implemented to achieve the foregoing example paths. For the purpose of description of FIG. 4 and Table 2, it will be assumed that a forward bias on a PIN diode corresponds to an ON state, and a reverse bias corresponds to an OFF state.

TABLE 2

| Active path | PIN diode 152 | PIN diode 156 | PIN diode 162 | PIN diode 166 |
|---|---|---|---|---|
| Between RFC and RF1 | ON | OFF | OFF | ON |
| Between RFC and RF2 | OFF | ON | ON | OFF |

Figure 5:
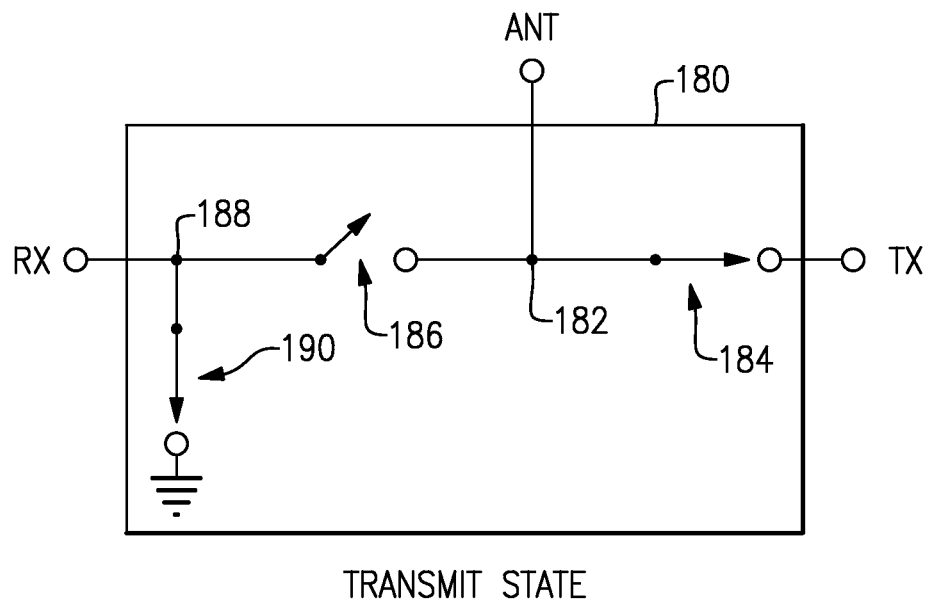
FIG. 5 shows an example topology of an RF switch circuit having a common antenna port ANT, a transmit port TX, and a receive port RX.
Figure 5:
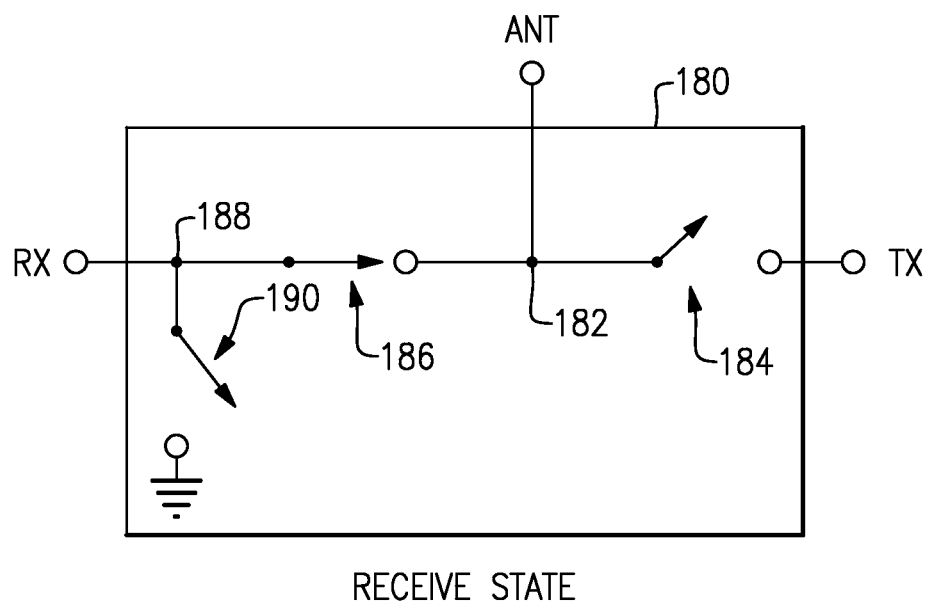

FIG. 5 shows an example topology of an RF switch circuit 180 having a common antenna port ANT, a transmit port TX, and a receive port RX. Such a topology can be implemented as a single-pole-double-throw (SPDT) with transmit and receive switching paths (TX and RX as the two throws) from a single common antenna port (ANT as the single pole).

In a transmit state, a signal path between ANT and TX can be achieved with a switch 184 being closed (ON), a switch 186 being open (OFF), and a shunt switch 190 (between node 188 and ground) being closed (ON). In a receive state, a signal path between ANT and RX can be achieved with the switch 184 being open (OFF), the switch 186 being closed (ON), and the shunt switch 190 (between node 188 and ground) being open (OFF). In the example of FIG. 5, the shunt path between node 188 and ground can provide improved isolation for the receive port RX (with the switch 190 closed) when the transmission path between TX and ANT is active.

Figure 6:
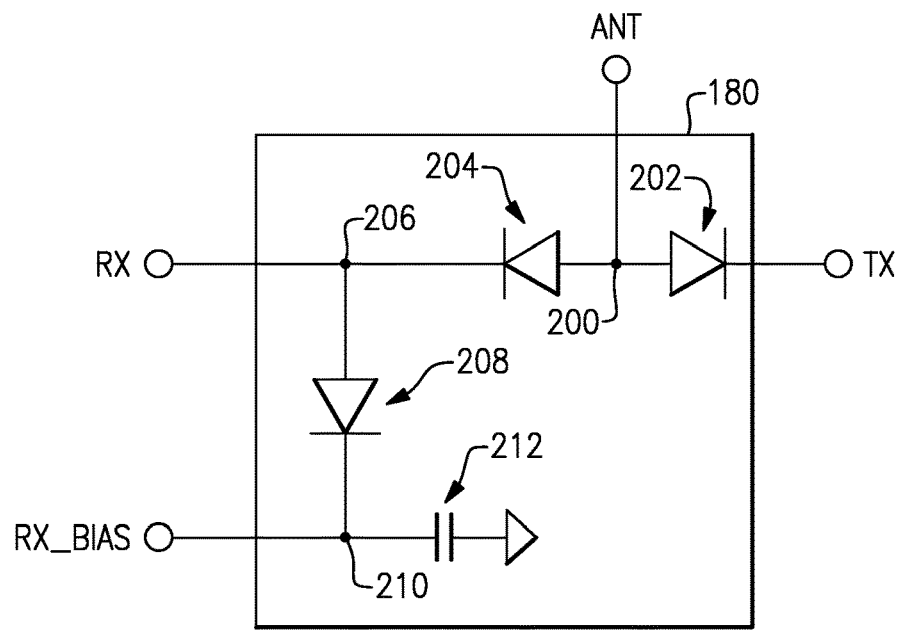
FIG. 6 shows an example RF switch circuit that includes a plurality of PIN diodes that can be configured to provide the functionality of the switches associated with the switching topology of FIG. 5.

FIG. 6 shows an example RF switch circuit 180 that includes a plurality of PIN diodes that can be configured to provide the functionality of the switches associated with the switching topology of FIG. 5. In the example of FIG. 6, a receive bias port (RX_BIAS) for the receive shunt diode switch can be provided.

In FIG. 6, a transmit path between TX and ANT can be formed through a first PIN diode 202 and node 200. A shunt path for the foregoing transmit path may or may not exist. A receive path between ANT and RX can be formed through node 200, a second PIN diode 204, and node 206. A shunt path for the foregoing receive path can be provided between node 206 and ground through a third PIN diode 208, node 210, and a capacitance 212. Table 3 lists states of the three PIN diodes that can be implemented to achieve the foregoing example paths. For the purpose of description of FIG. 6 and Table 3, it will be assumed that a forward bias on a PIN diode corresponds to an ON state, and a reverse bias corresponds to an OFF state.

TABLE 3

| Active path | PIN diode 202 | PIN diode 204 | PIN diode 208 |
|---|---|---|---|
| Between TX and ANT | ON | OFF | ON |
| Between ANT and RX | OFF | ON | OFF |

Figure 7:
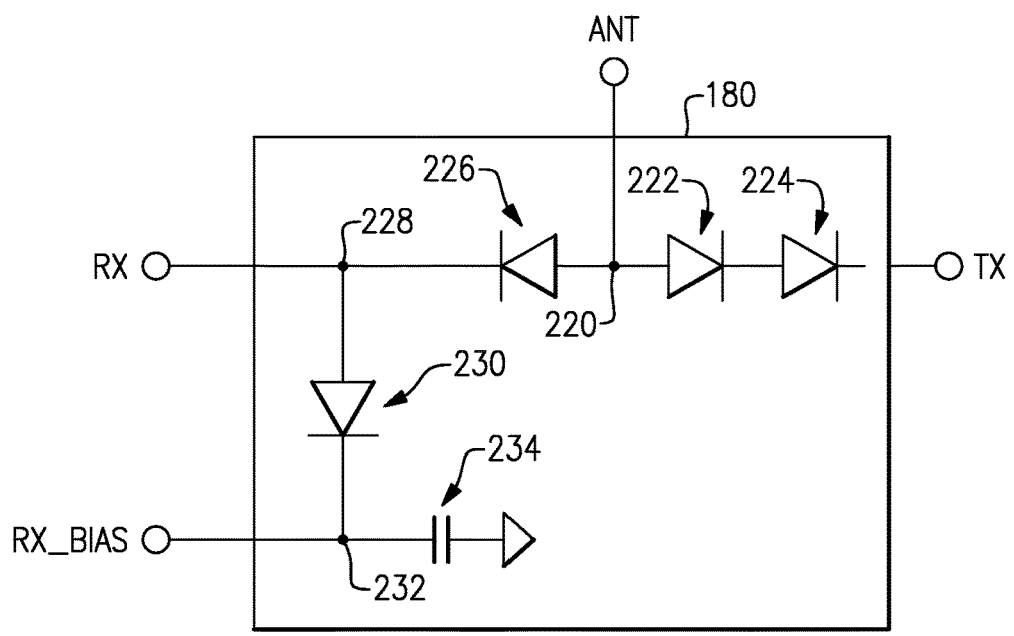
FIG. 7 shows another example RF switch circuit that includes a plurality of PIN diodes that can be configured to provide the functionality of the switches associated with the switching topology of FIG. 5.

FIG. 7 shows another example RF switch circuit 180 that includes a plurality of PIN diodes that can be configured to provide the functionality of the switches associated with the switching topology of FIG. 5. In the example of FIG. 7, a receive bias port (RX_BIAS) for the receive shunt diode switch can be provided.

In FIG. 7, a transmit path between TX and ANT can be formed through a first PIN diode 224, a second PIN diode 222, and node 220. A shunt path for the foregoing transmit path may or may not exist. A receive path between ANT and RX can be formed through node 220, a third PIN diode 226, and node 228. A shunt path for the foregoing receive path can be provided between node 228 and ground through a fourth PIN diode 230, node 232, and a capacitance 234. Table 4 lists states of the four PIN diodes that can be implemented to achieve the foregoing example paths. For the purpose of description of FIG. 7 and Table 4, it will be assumed that a forward bias on a PIN diode corresponds to an ON state, and a reverse bias corresponds to an OFF state.

TABLE 4

| Active path | PIN diode 224 | PIN diode 222 | PIN diode 226 | PIN diode 230 |
|---|---|---|---|---|
| Between TX and ANT | ON | ON | OFF | ON |
| Between ANT and RX | OFF | OFF | ON | OFF |

Figure 8:
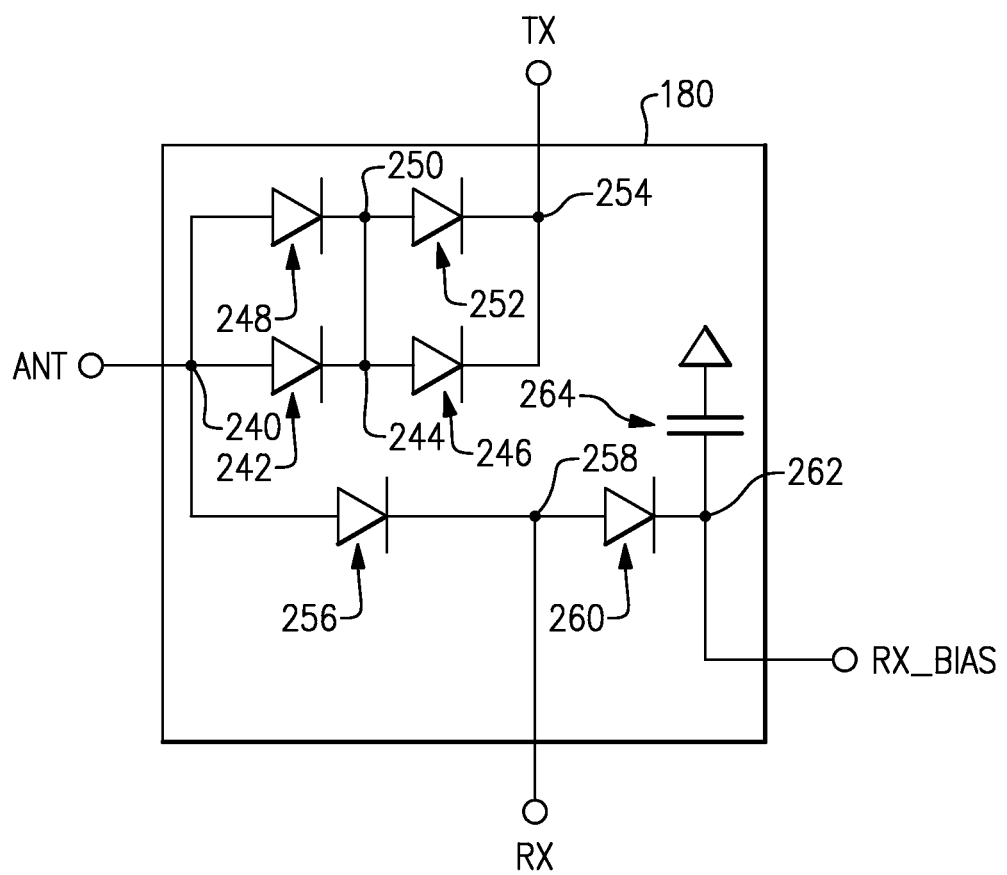
FIG. 8 shows yet another example RF switch circuit that includes a plurality of PIN diodes that can be configured to provide the functionality of the switches associated with the switching topology of FIG. 5.

FIG. 8 shows yet another example RF switch circuit 180 that includes a plurality of PIN diodes that can be configured to provide the functionality of the switches associated with the switching topology of FIG. 5. In the example of FIG. 8, a receive bias port (RX_BIAS) for the receive shunt diode switch can be provided.

In FIG. 8, a transmit path between TX and ANT can be formed through node 254, an assembly of PIN diodes 252, 248, 246, 242, and node 240. A shunt path for the foregoing transmit path may or may not exist. A receive path between ANT and RX can be formed through node 240, a PIN diode 256, and node 258. A shunt path for the foregoing receive path can be provided between node 258 and ground through a PIN diode 260, node 262, and a capacitance 244.

In the transmit path of FIG. 8, the assembly of PIN diodes 252, 248, 246, 242 can be operated in different manners to, for example, handle different power levels associated with RF signals to be transmitted. For example, a higher-power transmission path can have all of the PIN diodes 252, 248, 246, 242 turned ON so as to yield a series arrangement of a first set of parallel paths (PIN diodes 252, 246) and a second set of parallel paths (PIN diodes 248, 242). In another example, a lower power transmission path can have a path involving a series connection of two PIN diodes in ON state. For example, PIN diodes 252 and 248 can be turned ON, and PIN diodes 246 and 242 can be turned OFF. As described herein in reference to FIG. 2, other paths between nodes 254 and 240 are also possible. In the context of the foregoing examples of higher-power and lower-power transmission paths, Table 5 lists states of the various PIN diodes that can be implemented to achieve the foregoing example paths. For the purpose of description of FIG. 8 and Table 5, it will be assumed that a forward bias on a PIN diode corresponds to an ON state, and a reverse bias corresponds to an OFF state.

TABLE 5

| Active path | PIN diode 252 | PIN diode 248 | PIN diode 244 | PIN diode 240 | PIN diode 256 | PIN diode 260 |
|---|---|---|---|---|---|---|
| TX (higher power) | ON | ON | ON | ON | OFF | ON |
| TX (lower power) | ON | ON | OFF | OFF | OFF | ON |
| RX | OFF | OFF | OFF | OFF | ON | OFF |

In the example of FIG. 8 and Table 5, operation of the RF switch circuit 180 can include switching between TX_high (e.g., higher power) and RX, between TX_low (e.g., lower power) and RX, and between TX_low and TX_high. Other switching operations are also possible.

Figure 9:
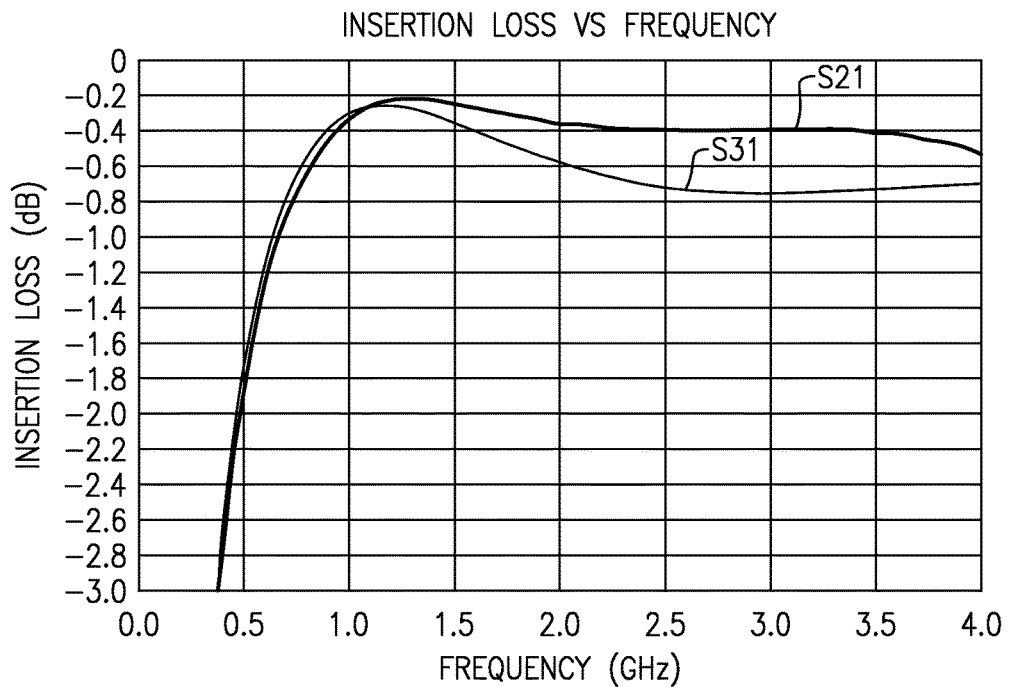
FIG. 9 shows insertion loss plots as functions of frequency.

FIGS. 9-12 show examples of performance plots associated with the RF switch circuit 180 of FIG. 8. FIG. 9 shows insertion loss plots as functions of frequency. The curve indicated as S21 is a |S21| plot for ANT to RX in insertion loss state, and the curve indicated as S31 is a |S31| plot for ANT to TX in insertion loss state.

Figure 10:
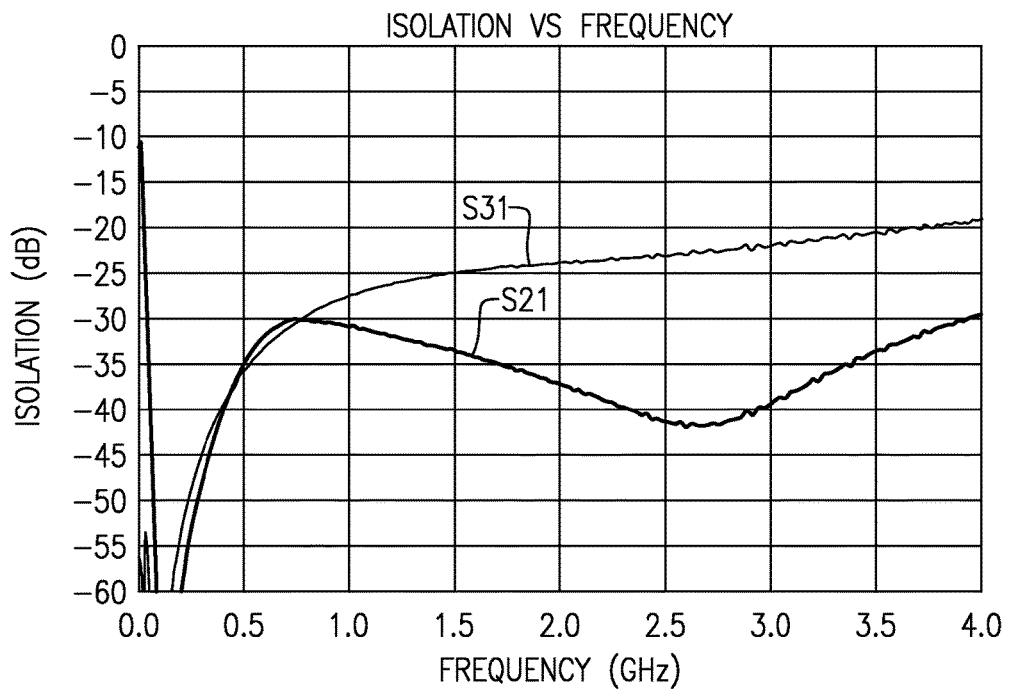
FIG. 10 shows isolation plots as functions of frequency.

FIG. 10 shows isolation plots as functions of frequency. The S21 plot is for ANT to RX isolation with ANT to TX in insertion loss state, and the S31 plot is for ANT to TX isolation with ANT to RX in insertion loss state.

Figure 11:
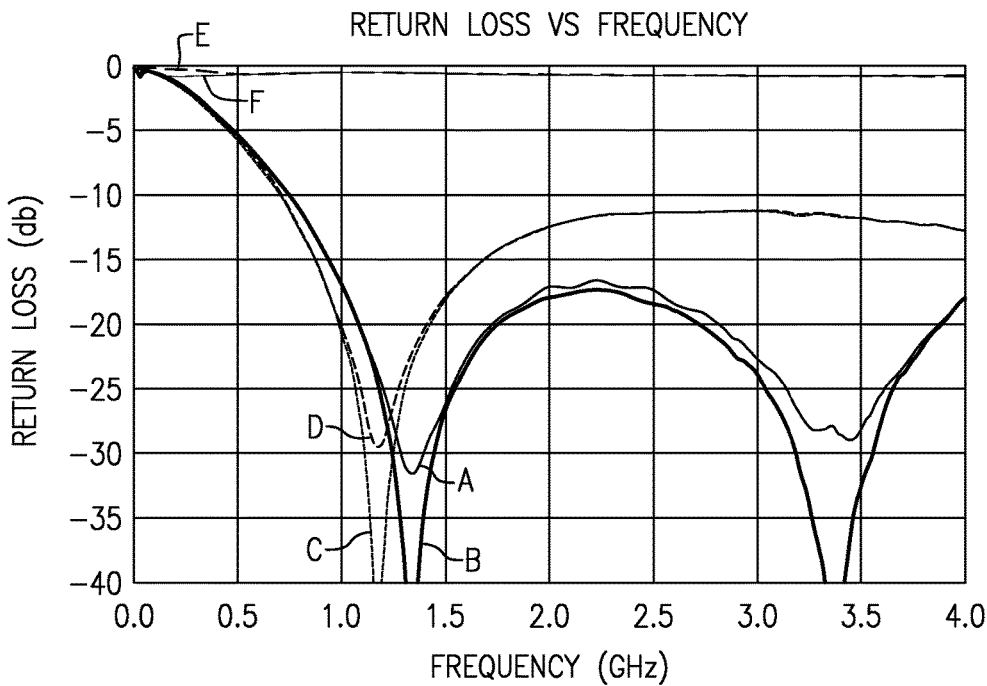
FIG. 11 shows various return loss plots as functions of frequency.

FIG. 11 shows various return loss plots as functions of frequency. |S11| curves, indicated as A and D, correspond to ANT return loss with ANT to RX in insertion loss state and ANT to TX in insertion loss state, respectively. |S22| curves, indicated as B and E, correspond to RX return loss with ANT to RX in insertion loss state and ANT to TX in insertion loss state, respectively. |S33| curves, indicated as C and F, correspond to TX return loss with ANT to TX in insertion loss state and ANT to RX in insertion loss state, respectively.

Figure 12:
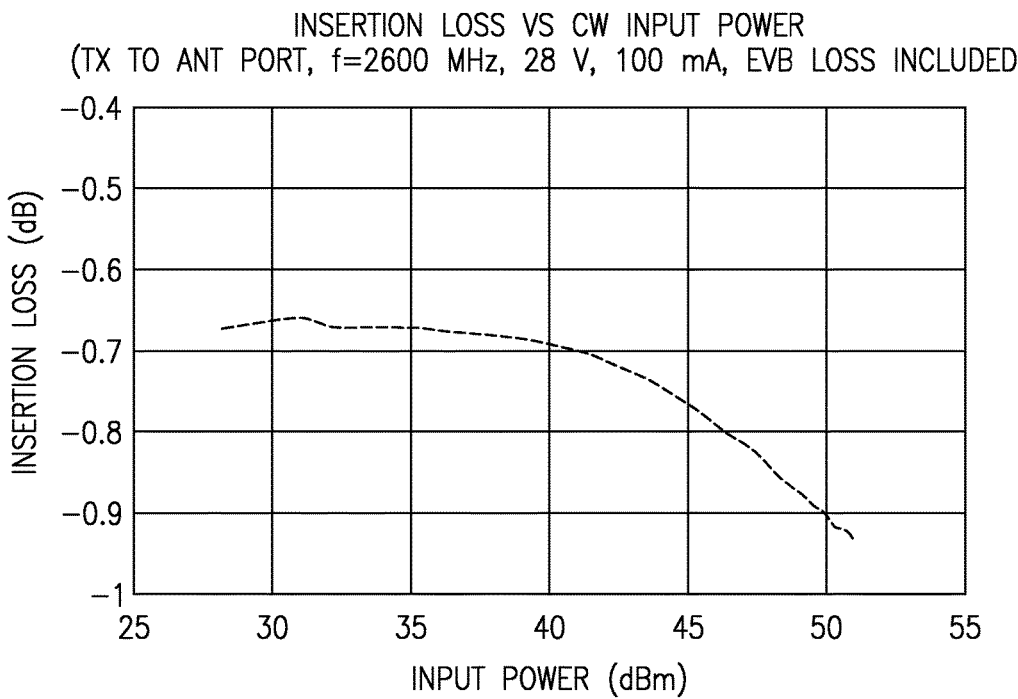
FIG. 12 shows a plot of insertion loss as a function of input power.

FIG. 12 shows a plot of insertion loss as a function of input power. The example plot corresponds to an operating condition of TX to ANT port at approximately 2,600 MHz, approximately 28V, approximately 100 mA, and with EVB loss included.

Figure 13:
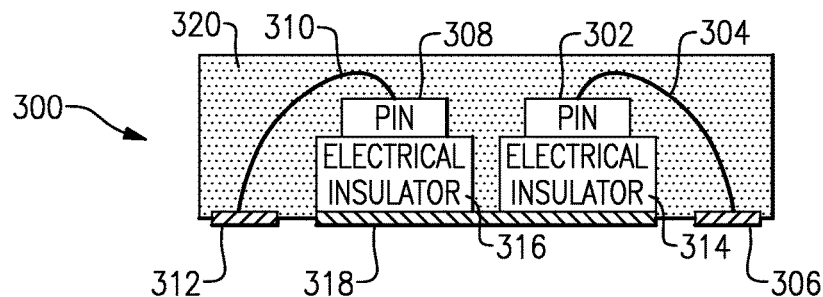
FIG. 13 shows an example module in which a plurality of PIN diodes can be mounted on their respective electrical insulator structures.
Figure 14:
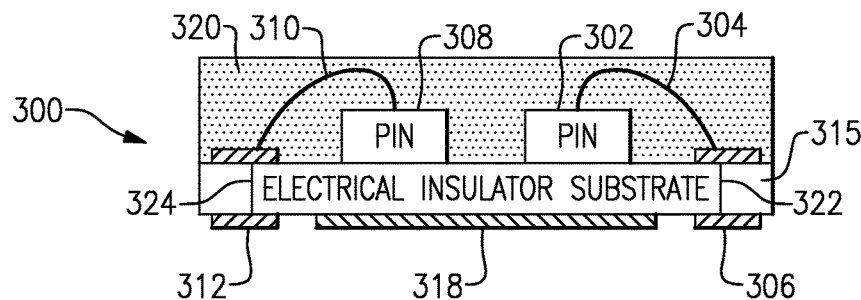
FIG. 14 shows an example module in which a plurality of PIN diodes can be mounted on a common electrical insulator substrate.

FIGS. 13 and 14 show examples of packaged modules 300 having PIN diode based switching circuits as described herein. In some switching applications, it is desirable to have an electrode (e.g., cathode) of a PIN diode be electrically isolated from ground and at the same time be implemented in a packaged module to allow effective removal of heat from the PIN diode. To address such design features, a PIN diode can be mounted on an electrical insulator having a low thermal impedance. The electrical insulator can be in physical contact (directly or through an intermediate layer) with a grounding pad, such that the PIN diode remains electrically isolated from the grounding pad. If the electrical insulator is thermally conductive, heat generated by the PIN diode can be transferred to the grounding pad through the electrical insulator.

In the example module 300 of FIG. 13, a plurality of PIN diodes are shown to be mounted on their respective electrical insulator structures. For example, a first PIN diode 302 is mounted on a first electrical insulator structure 314; and a second PIN diode 308 is mounted on a second electrical insulator structure 316. An electrode of the first PIN diode 302 is shown to be electrically connected to a first contact pad 306 through a wirebond 304, and an electrode of the second PIN diode 308 is electrically connected to a second contact pad 312 through a wirebond 310. The first contact pad 306 can be a TX port of, for example, the RF switch circuit 180 of FIG. 8, and the second contact pad 312 can be an RX port of the RF switch circuit 180. Although not shown in FIG. 13, an ANT port can be implemented as a contact pad of the module 300. In such a configuration, the first PIN diode 302 can be, for example, PIN diode 252 or 246 in FIG. 8, and the second PIN diode 308 can be PIN diode 256 of FIG. 8.

In the example of FIG. 13, both of the electrical insulator structures 314, 316 are shown to be coupled to a grounding pad 318. To facilitate thermal conduction between the PIN diodes 302, 308 and the grounding pad 318, the PIN diodes 302, 308 can be adhered to their respective electrical insulator structures 314, 316 by, for example, thermally conductive epoxy. Such a thermally conductive epoxy may or may not be electrically conductive. Further, the electrical insulator structures 314, 316 can be adhered to the grounding pad 318 by, for example, thermally conductive epoxy. Such a thermally conductive epoxy may or may not be electrically conductive.

In the example of FIG. 13, an overmold 320 can be formed to encapsulate various components such as the PIN diodes 302, 308, the wirebonds 302, 310, and the electrical insulator structures 314, 318. Such an overmold can be configured to yield a desirable package form factor that allows easy handling and mounting onto a circuit board.

In the example module 300 of FIG. 14, a plurality of PIN diodes are shown to be mounted on a common electrical insulator substrate 315. For example, a first PIN diode 302 and a second PIN diode 308 are mounted on the electrical insulator substrate 315. An electrode of the first PIN diode 302 is shown to be electrically connected to a first contact pad 306 through a wirebond 304 and an electrical path 322, and an electrode of the second PIN diode 308 is electrically connected to a second contact pad 312 through a wirebond 310 and an electrical path 324. The first contact pad 306 can be a TX port of, for example, the RF switch circuit 180 of FIG. 8, and the second contact pad 312 can be an RX port of the RF switch circuit 180. Although not shown in FIG. 14, an ANT port can be implemented as a contact pad of the module 300. In such a configuration, the first PIN diode 302 can be, for example, PIN diode 252 or 246 in FIG. 8, and the second PIN diode 308 can be PIN diode 256 of FIG. 8.

In the example of FIG. 14, the electrical insulator substrate 315 is shown to be coupled to a grounding pad 318. To facilitate thermal conduction between the PIN diodes 302, 308 and the grounding pad 318, the PIN diodes 302, 308 can be adhered to the electrical insulator substrate 315 by, for example, thermally conductive epoxy. Such a thermally conductive epoxy may or may not be electrically conductive. Further, the electrical insulator substrate 315 can be adhered to the grounding pad 318 by, for example, thermally conductive epoxy. Such a thermally conductive epoxy may or may not be electrically conductive. In some embodiments the grounding pad 318 and the contact pads 306, 312 can be formed on the surface of the electrical insulator substrate 315 utilizing one or more metallization techniques.

In the example of FIG. 14, an overmold 320 can be formed over the electrical insulator substrate 315 to encapsulate various components such as the PIN diodes 302, 308 and the wirebonds 302, 310. Such an overmold can be configured to yield a desirable package form factor that allows easy handling and mounting onto a circuit board.

In some embodiments, the electrical insulator structures 314, 316 and the electrical insulator substrate 315 of FIGS. 13 and 14 can be formed from aluminum nitride (AlN). Such a material can provide desired electrical insulation property, as well as desired thermal conductance property. It will be understood that other materials can also be utilized.

In some embodiments, the example modules 300 of FIGS. 13 and 14 can be implemented in, for example, a quad-flat no-leads (QFN) package format. A significant portion of the heat generated by the PIN diodes under high power RF signals can be conducted from the diode junctions to the grounding pad through the AlN substrate(s). When such a module is mounted on a circuit board, the heat can be further transferred from the grounding pad to a ground plane in the circuit board, and then to ambient surrounding via a heat sink.

Figure 15:
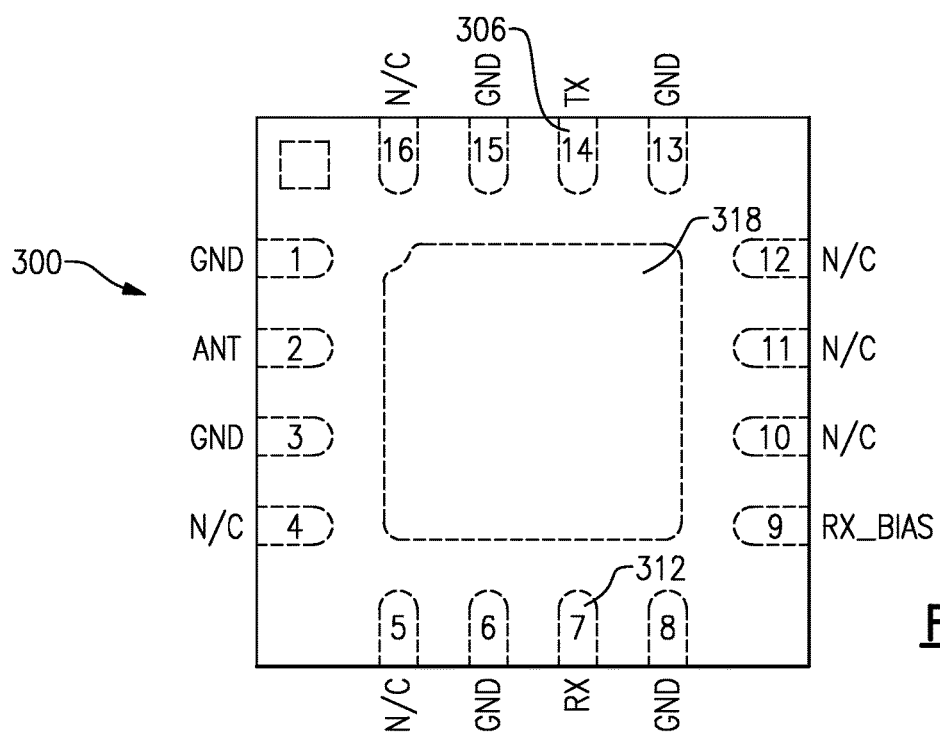
FIG. 15 shows an example pin layout that can be implemented for the examples of FIGS. 13 and 14 in an example QFN packaging format.

In the context of the example QFN packaging format, FIG. 15 shows an example pin layout that can be implemented for the examples of FIGS. 13 and 14. The grounding pad 318 can be implemented at or near the center of the lower surface of the module 300. Various connection pins such as the TX pin 306 and the RX pin 312 can be implemented along the periphery of the lower surface of the module 300.

Figure 16:
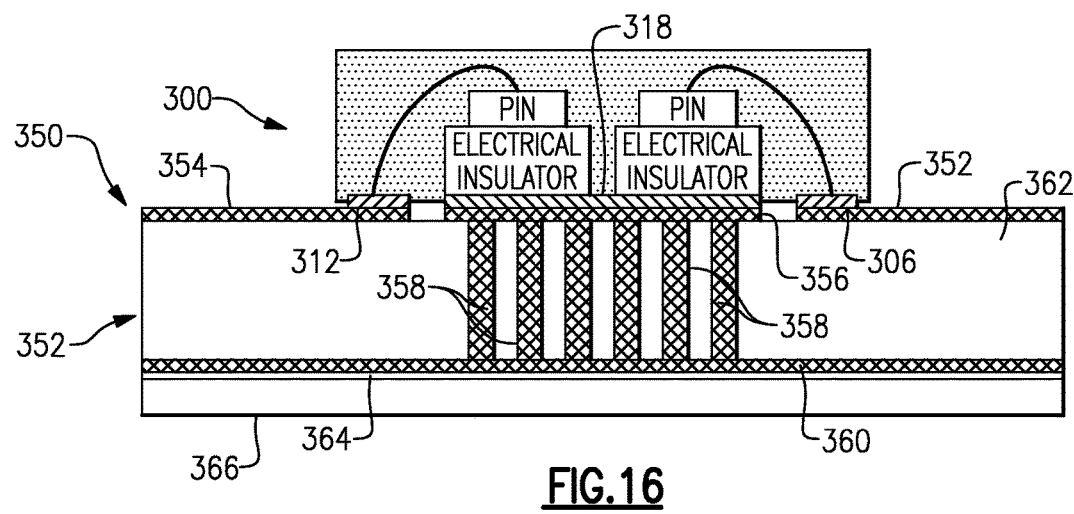
FIG. 16 shows an example configuration where a module is mounted on a printed circuit board (PCB).

FIG. 16 shows an example configuration 350 where a module 300 is mounted on a printed circuit board (PCB) 352. The module 300 can be either of the examples described in reference to FIGS. 13 and 14. The contact pads 306, 312 (e.g., TX and RX ports) of the module 300 are shown to be in contact with their respective contact features 352, 354. The grounding pad 318 of the module 300 is shown to be in contact with a corresponding grounding pad 356 on the PCB 352.

The grounding pad 356 is shown to be connected to a ground plane 360 through a plurality of conductive vias 358 formed through a substrate layer 362 of the PCB 352. Thus, heat arriving at the contact pad 318 of the module 300 can be transferred through the contact pad 356 of the PCB 352, through the vias 358, and to the ground plane 360.

In the example of FIG. 16, the ground plane 360 can be mounted to a chassis 366 through, for example, a solder mask layer 364. Accordingly, heat arriving at the ground plane 360 can be dissipated into the chassis 366.

Figure 17:
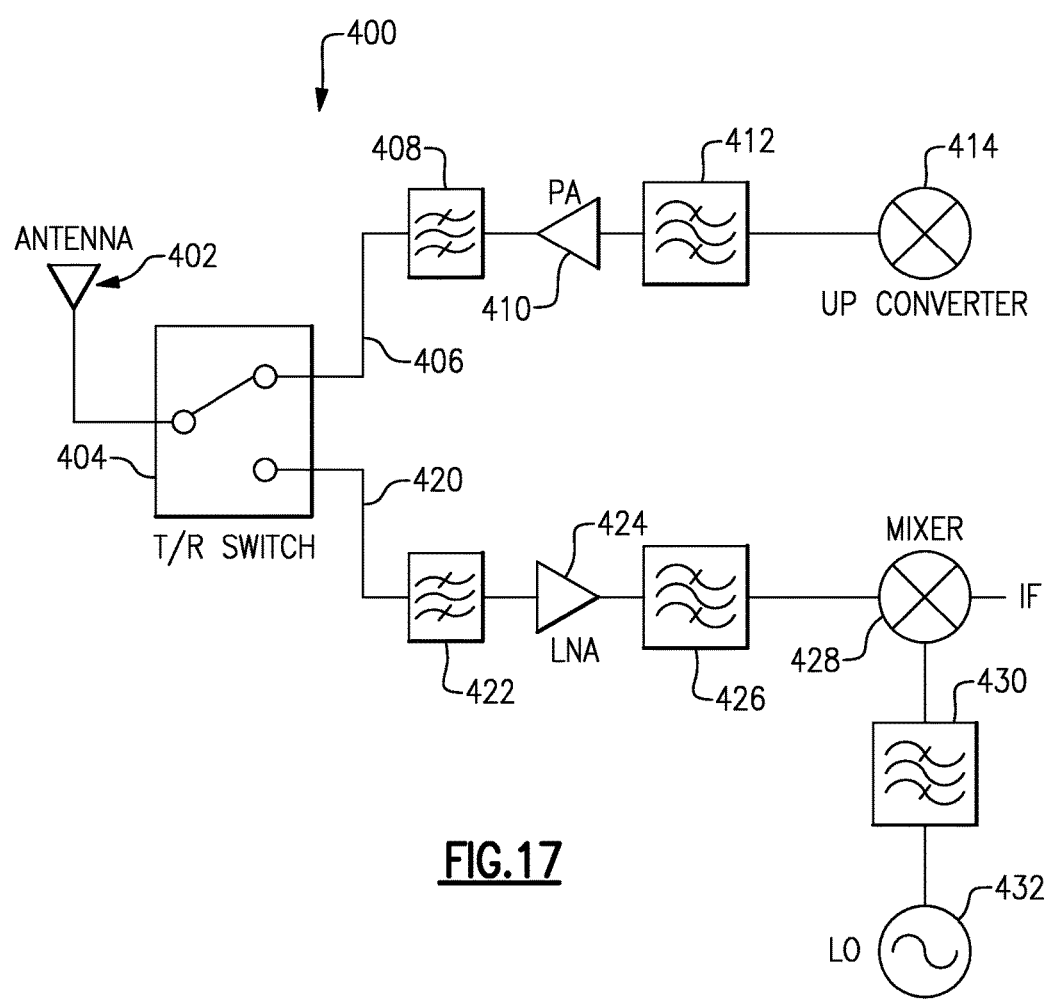
FIG. 17 shows that in some embodiments, a switching circuit or a switch module having one or more features as described herein can be implemented in an RF system.

FIG. 17 shows that in some embodiments, a switching circuit or a switch module having one or more features as described herein can be implemented in an RF system 400. In the example RF system 400, a transmit/receive (T/R) switch 404 can include PIN diodes implemented as described herein. Such a T/R switch can allow use of a common antenna 402 for transmit and receive operations. Such transmit and receive operations can be facilitate by switching actions of the T/R switch 404.

As shown in FIG. 17, the RF system 400 can include a transmit circuit configured to generate, amplify, filter, and transmit an RF signal. Such an RF signal can be generated from a baseband subsystem (not shown) and an upconverter 414. The RF signal can then be filtered (e.g., by a band-pass filter 412) before being amplified by a power amplifier (PA) 410. The amplified RF signal can further be filtered (e.g., by a band-pass filter 408) and be provided to the T/R switch 404 through path 406 so as to be routed to the antenna 402.

As further shown in FIG. 17, a received signal from the antenna 402 can be routed to a receiver circuit by the T/R switch 404 to a low-noise amplifier (LNA) 424 (e.g., through path 420 and a band-pass filter 422). The output of the LNA 424 can be filtered further by a filter 426 (e.g., a band-pass filter), and the filtered signal can be converted to an intermediate frequency (IF) signal for further processing. Such a conversion can be facilitate by a mixer 428, a local oscillator (LO) 432, and a filter 430.

In some embodiments, the example RF system 400 can be implemented in a base station. In such an application, the amplified RF signal to be transmitted can have relatively high power, and the T/R switch 404 needs to be able to handle such power while maintaining desirable performance levels. One or more features as described herein can be implemented in such a T/R switch 404 to allow handling of high power while providing excellent RF performance.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An antenna switch module (ASM) comprising:
a grounding pad;
an electrical insulator layer implemented over the grounding pad; and
a switch circuit including a plurality of first switchable paths, each implemented between an antenna port and a transmit (TX) port, each first switchable path including one or more PIN diodes implemented over the electrical insulator layer, each of the one or more PIN diodes of each of the first switchable paths implemented with a same polarity between the antenna port and the transmit port, the switch circuit further including a second switchable path implemented between the antenna port and a receive (RX) port, the second switchable path including one or more PIN diodes, each of the one or more PIN diodes of the second switchable path implemented with the same polarity as in each of the first switchable paths, between the antenna port and the receive port, implemented over the electrical insulator layer.

2. The antenna switch module of claim 1 wherein the electrical insulator layer is a thermal conductor thereby allowing conduction of heat between a PIN diode and the grounding pad.

3. The antenna switch module of claim 2 wherein the electrical insulator layer includes aluminum nitride (AlN).

4. The antenna switch module of claim 1 wherein each PIN diode is secured to the electrical insulator layer by a thermally conductive adhesive.

5. The antenna switch module of claim 1 wherein the electrical insulator layer is secured to the grounding pad by a thermally conductive adhesive.

6. The antenna switch module of claim 1 further comprising an overmold implemented over the electrical insulator layer, the overmold dimensioned to encapsulate at least the PIN diodes of the switch circuit.

7. A radio-frequency (RF) system comprising:
an antenna;
a transceiver in communication with the antenna; and
a transmit/receive (T/R) switch implemented between the antenna and the transceiver, the T/R switch including a grounding pad and an electrical insulator layer implemented over the grounding pad, the T/R switch further including a switch circuit having a plurality of first switchable paths, each implemented between an antenna port and a transmit (TX) port, each first switchable path including one or more PIN diodes implemented over the electrical insulator layer, each of the one or more PIN diodes of each of the first switchable paths implemented with a same polarity between the antenna port and the transmit port, the switch circuit further including a second switchable path implemented between the antenna port and a receive (RX) port, the second switchable path including one or more PIN diodes, each of the one or more PIN diodes of the second switchable path implemented with the same polarity as in each of the first switchable paths, between the antenna port and the receive port implemented over the electrical insulator layer.

8. The radio-frequency system of claim 7 wherein the RF system is implemented as a base station.

9. The radio-frequency system of claim 8 wherein the first switchable paths are configured to handle high power associated with amplified transmit signals associated with the base station.

10. The radio-frequency system of claim 8 wherein the plurality of first switchable paths includes a first PIN diode connected in series with a second PIN diode.

11. The radio-frequency system of claim 10 wherein the plurality of first switchable paths further includes a third PIN diode connected in series with a fourth PIN diode.

12. The radio-frequency system of claim 11 wherein a node between the first PIN diode and the second PIN diode is electrically connected to a node between the third PIN diode and the fourth PIN diode.

13. The radio-frequency system of claim 8 further comprising a switchable shunt path implemented between the RX port and a ground.

14. The radio-frequency system of claim 13 wherein the switchable shunt path includes a shunt PIN diode.

15. The radio-frequency system of claim 14 wherein the switchable shunt path further includes a capacitance between the shunt PIN diode and the ground.

16. The radio-frequency system of claim 14 further comprising a bias port electrically connected to a node between the shunt PIN diode and the ground.

17. A radio-frequency (RF) switch circuit comprising:
a plurality of first switchable paths, each implemented between a pole and a first throw, each first switchable path including one or more PIN diodes, each of the one or more PIN diodes of each of the first switchable paths implemented with a same polarity between the pole and the first throw, the plurality of first switchable paths including a series arrangement of a first set of parallel paths and a second set of parallel paths; and
a second switchable path implemented between the pole and a second throw, the second switchable path including one or more PIN diodes, each of the one or more PIN diodes of the second switchable path implemented with the same polarity as in each of the first switchable paths, between the pole and the second throw.

18. The radio-frequency switch circuit of claim 17 wherein the pole is an antenna port.

19. The radio-frequency switch circuit of claim 18 wherein the first throw is a transmit (TX) port configured to receive an amplified RF signal.

20. The radio-frequency switch circuit of claim 19 wherein the second throw is a receive (RX) port configured to output a received signal.

* * * * *